(12) United States Patent
Cinquini et al.

(10) Patent No.: US 7,147,887 B2
(45) Date of Patent: Dec. 12, 2006

(54) HIGHLY ABSORBABLE TASTE AND ODOR FREE ORGANIC NUTRITIONAL SUPPLEMENT MADE FROM FOOD BY PRODUCTS AND MIXABLE WITH SOLIDS AND LIQUIDS, AND METHOD OF MAKING SUCH

(76) Inventors: Carlos Alberto Ignacio Cinquini, Mitre 868, 5to Piso Oficina 1 (CP:2000) Rosario, Santa Fe (AR); Maria Imelda Genevois, Mitre 868, 5to Piso Oficina 1 (CP:2000) Rosario, Santa Fe (AR)

( * ) Notice: Subject to any disclaimer, the term of this patent is extended or adjusted under 35 U.S.C. 154(b) by 0 days.

(21) Appl. No.: 10/986,079

(22) Filed: Nov. 12, 2004

(65) Prior Publication Data
US 2006/0105020 A1 May 18, 2006

(51) Int. Cl.
*A23L 1/31* (2006.01)
*A23C 17/00* (2006.01)

(52) U.S. Cl. ...................... 426/647; 426/583
(58) Field of Classification Search .................. None
See application file for complete search history.

(56) References Cited

U.S. PATENT DOCUMENTS

| | | | |
|---|---|---|---|
| 1,673,964 A | 6/1928 | Atwood | |
| 2,809,113 A | 10/1957 | Simpson | |
| 4,089,978 A | 5/1978 | Lugay et al. | |
| 4,180,592 A | 12/1979 | Buckley et al. | |
| 4,182,777 A | 1/1980 | Saunders et al. | |
| 4,183,966 A | 1/1980 | Mickle et al. | |
| 4,211,798 A | 7/1980 | Cater | |
| 4,219,577 A | 8/1980 | Pedersen et al. | |
| 4,260,644 A | 4/1981 | Eriksson et al. | |
| 4,623,541 A | 11/1986 | Elliot et al. | |
| 4,818,557 A | 4/1989 | Conrad | |
| 5,089,287 A | 2/1992 | Michaelson | |
| 5,486,368 A | 1/1996 | de Boer et al. | |
| 5,575,999 A | 11/1996 | Yoder | |
| 5,707,514 A | 1/1998 | Yamasaki et al. | |
| 6,004,576 A | 12/1999 | Weaver et al. | |

FOREIGN PATENT DOCUMENTS

| | | |
|---|---|---|
| AR | 97-01-00093 | 6/1999 |
| AR | P020100362 | 11/2003 |

OTHER PUBLICATIONS

Bates R.P. et al. "Use of blood and cheese whey in bread: Nutritive value and acceptance". J. of Food Science, 1974, 39: 585-587. entire document.*
The term "hemoglobin", "colloid", "mill", "sufficiently" and "substantially"- Merriam-Webster Online Dictionary. see at the web at http://www.m-w.com. pp. 1-5.*

* cited by examiner

*Primary Examiner*—Jean C. Witz
*Assistant Examiner*—Satyendra K. Singh
(74) *Attorney, Agent, or Firm*—Shlesinger, Arkwright & Garvey, LLP

(57) ABSTRACT

The process includes a mix of cheese production whey (residual liquid from cheese manufacture) with blood of slaughter animals, whereby a biological process is undertaken with whole whey and through a thermal process proteins are precipitated and the yeast cells of the biomass are inactivated, both of which are separated simultaneously (whey protein and inactivated yeast); to this precipitate is added the precipitate of the oxidized blood together with the liquid of the biological process; this composite is put through a colloidal mill until a light and palatable paste is produced. The resultant product has a long shelf life and is constituted by liquid whey, residual from the production of cheese; yeast obtained during the biological treatment of whey; blood of slaughtered animals; a farinaceous support; and additives, as desired.

29 Claims, 1 Drawing Sheet

HIGHLY ABSORBABLE TASTE AND ODOR FREE ORGANIC NUTRITIONAL SUPPLEMENT MADE FROM FOOD BY PRODUCTS AND MIXABLE WITH SOLIDS AND LIQUIDS, AND METHOD OF MAKING SUCH

CROSS-REFERENCE TO RELATED APPLICATIONS

This application relates to Argentine patent application no. P020100362, filed Feb. 1, 2002, and which is incorporated herein by reference.

This application likewise relates to Applicant's Argentine patent application no. 97-01-00093, filed on Jan. 10, 1997, entitled: Un Producto Alimenticio de Bajo Costo Aplicable A Emergencias Alimentarias Y el Procedimiento Para Su Elaboracion" (Nutritional Product of Low Cost Appropriate for Humanitarian Emergencies and the Process for its Manufacture).

FIELD OF THE INVENTION

The invention relates to nutritional supplements. More specifically, the invention relates to nutritional supplements made of waste or by products of food production, such as whey and blood. Even more specifically, the invention relates to a nutritional product having a high nutritional content, including a mixture of whey from cheese production which has been subjected to a biological process, the blood of slaughtered animals, such as cattle, chickens, and hogs, and including a step for rendering the mixture in a colloidal form, to yield a nutritional product which is highly absorbable, palatable, unscented, has a desirable mouthfeel, a long shelf life, in both a paste and powder form, and a process of making such a nutritional supplement.

BACKGROUND OF THE INVENTION

Nutritional supplements are known.

Foodstuff and processes of making one foodstuff from constituents of a more basic foodstuff are likewise known.

Examples of known United States patents include:
U.S. Pat. No. 4,182,777 to Saunders et al.;
U.S. Pat. No. 4,183,966 to Mickle, deceased et al.;
U.S. Pat. No. 4,260,644 to Eriksson et al.;
U.S. Pat. No. 4,818,557 to Conrad;
U.S. Pat. No. 5,707,524 to Potter;
U.S. Pat. No. 2,809,113 to Stimpson et al.;
U.S. Pat. No. 4,211,798 to Cater;
U.S. Pat. No. 5,486,368 to de Boer et al.;
U.S. Pat. No. 4,089,978 to Lugay et al.;
U.S. Pat. No. 1,673,964 to Atwood;
U.S. Pat. No. 4,180,592 to Buckley et al.;
U.S. Pat. No. 4,219,577 to Pedersen et al.;
U.S. Pat. No. 4,623,541 to Elliot et al.;
U.S. Pat. No. 5,089,287 to Michaelson;
U.S. Pat. No. 5,575,999 to Yoder;
U.S. Pat. No. 6,004,576 to Weaver et al.;

Dr. Alan H. Pressman, D.C., Ph.D., C.C.N., a nationally recognized authority on diet and nutrition states: "Today our understanding of how vitamins, minerals, and other supplements work is growing by leaps and bounds. We're building a solid foundation of scientific support for nutritional supplements. We believe that as this work continues, more and more people will come to realize that they can avoid health problems tomorrow through better nutrition today. We also believe that mainstream health-care practitioners will come to accept the value of nutritional supplements for preventing and treating many health problems." *The Complete Idiot's Guide to Vitamins and Minerals*, Second Edition, Alpha Books, 2000.

Phyllis A. Balch, CNC and James F. Balch, MD, widely recognized authorities on nutrition go on to say: "A poll of 37,000 Americans conducted by Food Technology found that half of them were deficient in vitamin B6 (pyridoxine), 42 percent did not consume sufficient amounts of calcium, 39 percent had an insufficient iron intake, and 25 to 39 percent did not obtain enough vitamin C. . . . Use only natural (not synthetic) supplements from a reputable source." *Prescription for Nutritional Healing*, Third Edition, 2000.

In 2002, the American Medical Association (AMA), which for decades had dismissed the importance of vitamin supplements, changed its collective mind after Harvard-based Robert H. Fletcher and Kathleen M. Fairfield, authors of a study covering 26 years' worth of scientific studies relating vitamin levels to the risk of chronic illness, published their findings in *The Journal of the American Medical Association* (*JAMA*).

The major development of the brain is produced in the first days and months of life. The development of children born from undernourished parents is slower, less oxygen arrives at their neurons and, therefore, such neurons function more slowly than those of other healthier and better nourished children. Aside from their immune systems, which are less likely to react in the face of illnesses, a great portion of such babies will reach adolescence with an already limited future.

Taking into account nutritional statistics, on a global basis, nutritional deficiencies found are based on three important areas:
a) Proteins
b) Iron; and
c) Vitamins Carbohydrates are relatively easy and cheap to produce, fats are less important and could, if necessary, be synthesized, and the majority of vitamins are synthesized on an industrial scale. However, the production of proteins is expensive and difficult.

The major scarcity relates to proteins of animal origin such as meat, milk, eggs, etc., the production of which is less efficient that that of vegetable foods. The principal advantage of animal sourced proteins is that they contain an excess of those amino acids that are missing in vegetable proteins, such that a small quantity of animal proteins complements the proteins of a vegetable diet.

The protein consultant group Protein Advisory Group (WHO/FAO/UNICEF), currently known as "Advisory Group of the United Nations System on Proteins and Calories" [(1) Nutrition and Diet Foods, Ed. Acribia A. E. Bemder), indicates that in order to supplement meals attention must be directed to the following factors:

1. Nutritional value of the individual ingredients and the final product;
2. Possibility of the existence of toxic or interference substances;
3. Avoiding those processes that reduce nutritional value;
4. Possibility of using local products;
5. Low cost;
6. Good conservation quality; and
7. Acceptability Examples of some existing protein mixes are:

| Product | Origin | Composition | Protein |
| --- | --- | --- | --- |
| Incaparina | Guatemala | Corn, cotton seed flour, vitamin A, CO₃ Ca, lysine | 27.5% |
| Pronutro | South Africa | Corn, powdered skim milk, peanuts, soy, fish flour, yeast, wheat germ, Vit. A, B1, B2, Niacin, sugar, iodized salt | 22% |
| Ceplano | USA | Fat free corn flour, wheat, fat free soy flour, CO₃ Ca, vitamins | 18–22% |

Registered commercial preparations:

| Product | Origin | Composition | Protein |
| --- | --- | --- | --- |
| Procol | England | Precipitated proteins from milk and skimmed milk | |
| Probimalt | USA | Skimmed milk, yeasted casein, mineral vitamins | 57% |

As it is widely known, a simple mix of whey from cheese production and blood, without further processing, presents two problems, as follows:

a) From a nutritional viewpoint, the simple use of whey does not achieve the desired nutritional levels, since there would be a deficiency of vitamins, amino acids, excess of carbohydrates, lower protein content, etc. An additional problem is the percentage of lactose that is contained in whey which produces diarrhea in persons that have not developed the enzyme lactase.

b) Without further processing of the blood, unpleasant organoleptic characteristics, i.e., unpleasant color and a sandy consistency to the palate, which makes it unpalatable, are features of untreated blood. It is for this reason that blood is only used in very small quantities, for example, in blood sausage.

While previously there have been successful attempts to lighten the color of blood with oxidation for visual improvement for use in animal feeding, the granular consistency of the result was generally unsuitable for human consumption, except for certain products.

Attempts with different types of colorings and flavorings, as well as with thickeners and gelatins, have been previously unsuccessful in eliminating completely such organoleptic problems.

OBJECTS AND SUMMARY OF THE INVENTION

It is an object of the invention to overcome the drawbacks of the prior art.

Another object of the invention is that future generations be adequately nourished, and that new sources of nutrition be found, a nutrition that is complete from a nutritional point of view, and that requires a minimum of land, time and cost to produce.

It is another object of the invention to overcome the drawbacks of prior art nutritional products and the processes and method of making such.

Another object of the invention is to provide a nutritional supplement which is environmentally friendly, uses food by products which many have considered to be waste products, and which may be produced inexpensively.

Another object of the invention is to provide a nutritional supplement which has a consistent structure, and which can be produced substantially odor free and taste free, so that it may be used as a nutritional supplement by itself or as a nutritional food additive.

Another object of the invention is to provide a nutritional supplemental using whey and blood that has fewer damaged proteins than known nutritional supplements.

A still further object of the invention is to provide a nutritional supplement which may be made in a paste or powder form, each having a relatively long shelf life.

A further object of the invention is to provide a nutritional supplement, and process of making such, which can be made cost-effectively, so that the product and process may be made and carried out by small to medium size companies.

Another object of the invention is to provide a nutritional supplement which may be made of a mixture of the whey produced during the production of cheese and the blood produced during the slaughter of animals such as cattle, hogs, and chickens.

In summary, the invention includes a nutritional supplement made from a processed mixture of cheese whey and livestock blood.

The invention likewise includes a nutritional supplement made from cheese whey and livestock blood that has undergone a biological process including a step of rendering the mixture in a colloidal form, which may be subsequently at least partially dried to yield a paste or a powdered end product.

It will be seen that the product resulting from the process described herein has achieved the objects of the production of an organic, highly nutritional, highly versatile product at low cost appropriate for a wide spectrum of users. The product is appropriate for the general population, but especially useful for quick supply in humanitarian emergencies, to supplement the diet of undernourished children, women and the elderly, as well as to aid in the ever increasing fight against obesity in which this and other countries are engaged. It is a tasteless, odorless nutritional supplement that may be used in many ways, be it in the industrial manufacture of foods or at home to be mixed in ready to eat meals or beverages.

The nutritional product referred to herein is essentially a protein mix rich in essential amino acids, carbohydrates and minerals, principally iron, and low in fat. It may be considered a nutritional supplement that contains all the necessary elements for an optimal nutrition.

The inventive product is based on whey from cheese production which is mixed, through an innovative method, with blood from healthy animals of slaughter extracted in hygienic conditions, resulting in a nutritional product that in its final form may be presented in an light(i.e., low density) highly palatable paste of a light color, and that may also be made in a powdered form conserving all of its highly nutritional properties.

It is an environmentally friendly product since it is made from industrial byproducts that usually are wasted as effluents, i.e., whey from cheese production and blood from slaughtered animals.

The nutritional product obtained by virtue of the method of the invention is notable due to the fact that it utilizes unconventional sources of nutrition which, once processed, are utilized. It employs by products of other industries (which in many cases would otherwise end up as effluents), as is the case of the dairy and meat packing industries.

The product obtained is based on the whey of cheese production and the blood from bovines and/or porcine slaughter animals which contain the most commonly deficient elements of undernourishment referred to above: proteins, iron and vitamins.

The present invention overcomes the above-described problems, such as organoleptic problems, through a process whereby it is possible to obtain a product with a consistency of a light creamy paste of high palatability, that is of a light color, that may also be made in powder form conserving all of its nutritional properties. Evaluated in comparison with an egg, where the nutritional value of the egg is considered 100, or "perfect food", the nutritional value of the inventive product is 90.

The inventive product includes two by-products of the food industry; namely, whey from cheese production and blood from the meatpacking industry. The innovative process produces a mix of fermented cheese whey (biomass) with blood extracted in hygienic conditions from healthy slaughtered animals (such as bovine and/or porcine blood).

An inventive nutritional product, and method of making such has been achieved by the product being a light, spreadable paste, highly palatable and of a light pleasant color, which can also be made in powder form, while conserving its nutritional properties. The nutritional properties were confirmed by experiments as described below.

It will be understood that relative terms such as inexpensive, palatable, pleasant, desirable, mouthfeel, paste, and the like are for convenience only and are not intended to be limiting.

DETAILED DESCRIPTION OF THE INVENTION

Figure 1:
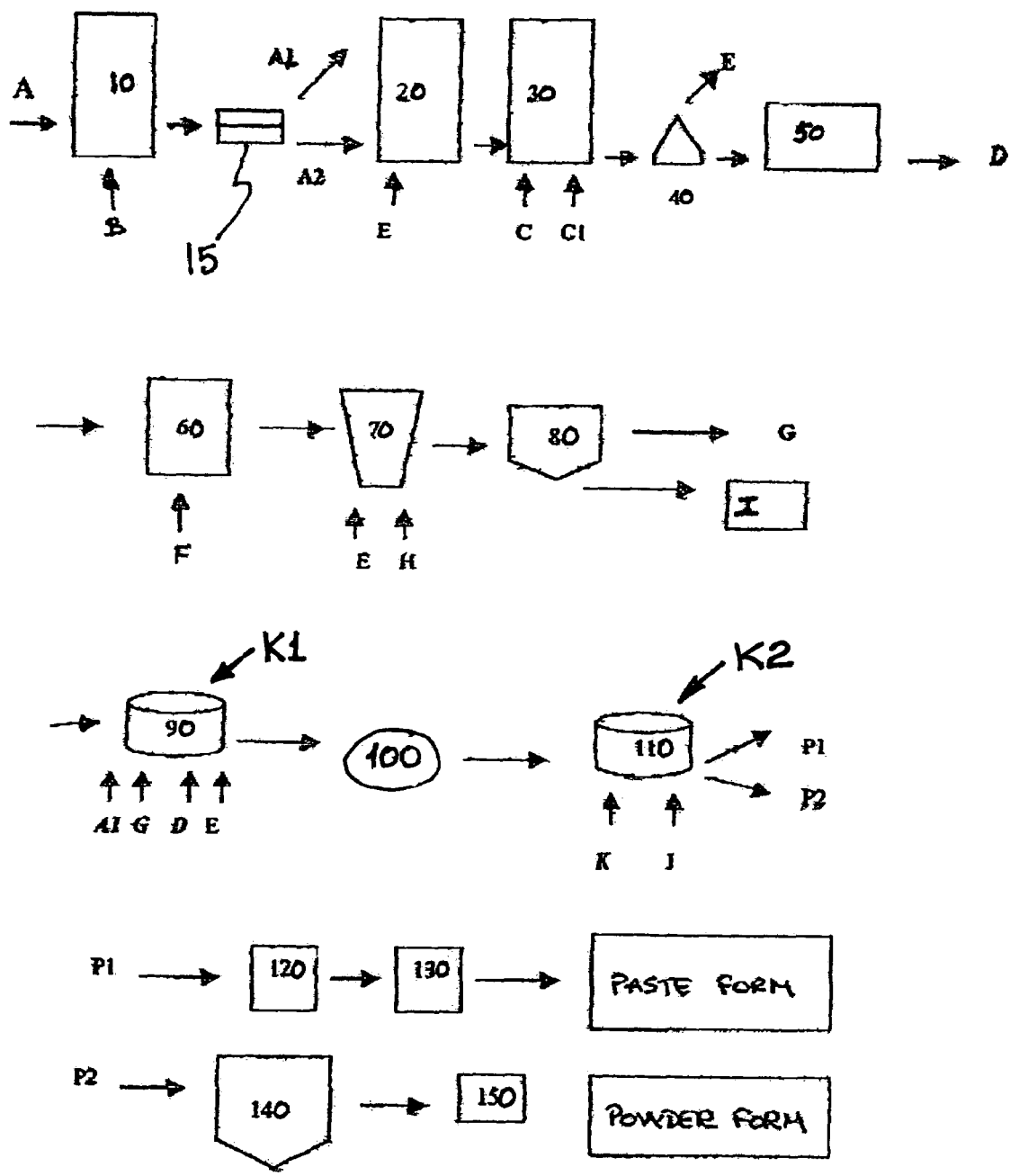
FIG. 1 is a block diagram or flow chart showing the process of making the nutritional supplement according to the invention.

The term blood is used for convenience to refer to whole blood. The inventive process has been found to work well with whole blood, as well as with hemoglobin; i.e., blood with the plasma removed, and rehydrated dried blood.

The inventive nutritional product and the inventive process of making such will now be described first with reference to a sixteen (16) step description of a process for carrying out the invention.

The invention will be then described with reference to the flow chart or flow diagram of FIG. 1.

Then, fifteen (15) examples of tests carried out in accordance with the invention will be described.

GENERAL DESCRIPTION OF THE NUTRITIONAL PRODUCT AND THE PROCESS FOR MAKING SUCH ACCORDING TO THE INVENTION

1) Obtain whey from cheese production (residual liquid from the preparation of cheese), which may be utilized in the form resulting from cheese production, or in a modified form; e.g., in a concentrated or powder form. The use of ultrafiltration in the separation of whey concentrate from the permeate is the preferred processing of the whey to preserve its nutritional properties;

2) When using whey protein concentrate (WPC) or powdered permeate, the dilution may be carried out taking into account the lactose concentration as well as the dilution liquids to be used. Depending on the type of deproteinized whey (permeate) that is utilized, the user may dilute the permeate to a concentration equivalent to 4.5 to 5.2% of lactose with potable water and/or the supernatant liquid of the biological process of Step 8, described immediately below. The water for such dilution may have a low saline content 3) To this solution are added salts which are sources of P (phosphorous), N (nitrogen), K (potassium), Mg (magnesium), etc. which salts are utilized as nutrients for the microorganisms that are inoculated;

4) The pH is regulated to between 4.4 and 4.8%, which is the optimum for the development of the microorganisms. The pH regulation may be done with concentrated sulfuric acid;

5) Sterilized air is then injected and inoculation is achieved with a culture of selected yeasts: *Kluyveromyces lactis, Saccharomyces fragilis, Saccharomyces cervisiae* and *Torulopsis cremoris*. The combination of the microorganisms *Kluyveromyces lactis* and *Saccharomyces cerevisiae*, may be preferable, as after trial and error these two have been found to be the most efficient in the production of the desired biomass. The *Kluyveromyces lactis* was found very efficient in the consumption of lactose and *Saccharomyces cerevisiae* was found to be efficient in the consumption of residuals such as glucose and lactate. The *Torulopsis cremoris* and *Saccharomyces fragilis* may be considered alternatives to the *Kluyveromyces lactis;*

6) The preparation is then incubated at a temperature of 28° to 30° C. for between 35 to 40 hours. In this manner a cellular biomass is obtained due to the consumption of lactose by the microorganisms, finalizing the stage of this biological process, when the remaining lactose content is less than the 30% of the initial value, i.e., at 1.3% to 1.4%;

7) The biomass is separated through centrifugation or ultrafiltration. The separated biomass undergoes a thermal treatment of between 85° and 90° C. for approximately 15 minutes, which inactivates the live cells;

8) Part of the supernatant liquid is recycled a) for the successive production of the biomass in Step 2, b) for the dissolution of dry hemoglobin; and/or c) the mixture of the biomass with the hemoglobin precipitate, and the remaining liquid is effluent;

9) The user may separately have available anticoagulated blood or hemoglobin of slaughter animals such as bovine, avian, or porcine (in liquid or dry form);

10) In the event that the blood is in dry form, it may be dissolved with the supernatant liquid of the biological process in Step 8 above;

11) The blood is discolored through a chemical oxidation with hydrogen peroxide producing a precipitation. It is then separated through filtration or centrifugation;

12) The precipitate is separated and the supernatant liquid from the biological process in Step 8 above is added;

13) At this stage one proceeds to mix the precipitate of the biomass and whey proteins with the oxidized blood and the supernatant liquid from the biological process;

14) The mix, together with a farinaceous support, is put through a colloidal mill where the paste is homogenized. Additives, such as flavorings and spices may be added, depending on the desired characteristics, such as flavor, that the end user wants to give the final product;

15) If it is desired that the final product be in paste form, the mix is then sterilized by a thermal treatment at 70 C. The moisture content is adjusted, if necessary, with the supernatant liquid from the biological process; resulting in a pasty final product which may then packaged;

16) If the final product is to be in powder form, it is not heated, but rather it is taken through a spray chamber to produce the desired powder form.

Description of FIG. 1

The nutritional product according to the invention and the process of making the nutritional product may be understood as described above, and in connection with the flow chart or diagram of FIG. 1.

FIG. 1 shows a reception tank 10 for receiving whey A, such as received from a cheese manufacturing plant.

Water B may be added to tank 10, in accordance with the amount of additional moisture required.

An optional filtering step, such as with an ultrafiltration device 15, may be provided for filtering whey A, as needed. As shown, a whey protein concentrate A1 may be sent to a mixing step 90 described below, and a deproteinized whey (permeate) A2 is received by a tank 20 for the adjustment of the concentration of the lactose. A supernatant liquid E from a fermentation step may be likewise introduced into tank 20 at this step.

Then, a fermentation tank 30 for carrying out a biological process receives the material from tank 20. Sterile air C and nutrients, acid, and inoculate of yeast C1 are likewise added to fermentation tank 30 at this stage to generate a biomass.

Then, in a centrifugation or ultrafiltration step 40 for the separation of the biomass received from fermentation tank 30, filtration may be carried out. A supernatant liquid E from step 40 may be recycled and may be sent, at least in part, to tank 20, 70 and 90. The biomass from step 40 is then sent to a bioreactor 50 at which step the biomass undergoes thermal treatment.

When ultrafiltration is not used, it is believed that the proteins in the final inventive product are damaged more than when ultrafiltration is used.

An inactivated biomass D is then sent from the bioreactor 50 to a mixing step or stage 90 described below.

A vessel or reception step 60 for receiving blood or hemoglobin receives a quantity of blood or hemoglobin F.

A reactor 70 or reactor stage for the discoloration of the blood is provided. A quantity of hydrogen peroxide H and supernatant E from the centrifugation or ultrafiltration step or device 40 is added at the step or reactor 70 for carrying out the discoloration of the blood or hemoglobin F.

A filtration or centrifugation step 80 (i.e. the separation of the discolored blood) is then carried out. A quantity of discolored blood or hemoglobin G results, as well as liquids which may be considered an effluent I.

A mixer or mixing stage 90 is provided into which whey protein concentrate A1, discolored blood or hemoglobin G, inactivated biomass D, the supernatant liquid E from fermentation and flour or farinaceous support K1 are directed.

A step or device 100 for turning the mix resulting from the mixer 90 into a colloid is provided. The device for producing a colloid from the product resulting from the earlier stages may be a colloidal mill.

A further mixer 110 may be provided to which an additive J, such as a flavoring, and a flour or other farinaceous support K2 is added. Farinaceous support K2 may be added in addition to or instead of farinaceous support K1 added at mixer 90.

A product P1 of the resultant mix and additives, such as flavourings, J may be sent to a sterilization step or sterilizer 120 for heating and sterilization. From there, the sterilized paste may be sent to a packaging step or packing device 130.

Such yields the desired nutritional product in a paste form having an extended shelf life in accordance with the invention.

As an alternative, an unheated product P2, which is the product of the mix and additive J without heating, may be sent to a spraying stage or spray chamber 140 to produce a powder form having an extended shelf life in accordance with the invention. The resultant powder may then be sent to a powder packaging stage or device 150.

Properties of the Product Attained

It may first be noted that:

a) the average composition of whey from cheese production is:

| | |
|---|---|
| Moisture | 92.6–93.5% |
| Fat | 0.3–1.0% |
| Proteins | 0.8–1.0% |
| Lactose | 4.5–5.2% |
| Minerals | 0.6–0.8% | b) The average composition of blood from bovine or porcine animals is about:

| | |
|---|---|
| Moisture | 80.5% |
| Protein | 17.8% |
| Fat | 0.13% |
| Glucose | 0.06% |
| Miscellaneous | 0.85% |

By means of the centrifugation of the blood, already anticoagulated, the hemoglobin and the plasma are separated. The hemoglobin has an average composition of:

| | |
|---|---|
| Moisture | 66% |
| Proteins | 33% |
| Minerals | 1% |

The composition of the farinaceous support contains approximately:

| | |
|---|---|
| Moisture | 10–12% |
| Sugar | 1.5–2.0% |
| Fibers | 0.5–1.0% |
| Ashes | 0.4–0.8% |
| Proteins | 10–18% |
| Starch | 70–75% |
| Fat | 1–2% |

The farinaceous support may be wheat flour.

The composition of yeast contains approximately:

| | |
|---|---|
| Protein | 50% |
| Carbohydrates | 43% |
| Ash | 5% |
| Fat | 2% |

In order to arrive at the desired nutritional product, the inventive method was devised by which it is possible to develop a product comprising a light, spreadable paste, highly palatable and of a light pleasant color, which can also be made in powder form, while conserving its nutritional properties. The nutritional properties were confirmed by analytical and biological experiments with rats up to the fifth generation.

The product resulting from the process thus described is a protein mix rich in essential amino acids, vitamins, carbohydrates and minerals (principally iron) and low in fat, edible and necessary for proper human nutrition.

Due to the fact that this product is the result of the formulation and processing of different ingredients, it is possible to modify the final composition depending on the requirements of the final destination.

To ensure the absence of toxins and to establish the nutritional value of the finished product a biological test was designed independently from the data obtained in the laboratory.

The biological experiment was undertaken in the Department of Physiology of the School of Agronomy and Veterinary of Esperanza of the National Litoral University in Argentina, using parcels, utilizing the standard breeding methodology of 3×2×2 with a total of 150 rats through the fifth generation with clinical, biochemical and histopathological experiments with excellent results.

Additional notable properties of this organic invention are that a) the iron is in large part assimilated, which is not the case with the synthetic nutritional supplements, i.e., it is available in a concentration of 70 to 80 mg per 100 g of product; and b) the fat content is very low, between 1 and 2%, which permits its consumption without health risks.

The invention has the advantage of the versatility and practicality of use, as it may be utilized with various flavors, sweet or sour, and may be adapted to the particular preferences of the population that is to receive it. This is particularly useful if the invention is to be used in humanitarian emergencies throughout the world in different cultures, either in its paste or powder form.

Economic Considerations

This product has animal proteins that contain substantial amounts of amino acids, absent in vegetables, with a value of digestible proteins greater than 90%.

Given the fact that this is a product of high protein value, with great digestibility and considering its composition from traditional foods, it is clearly apparent that the ratio cost/benefit is highly satisfactory since it not only can substitute for the traditional proteins, but also offers comparatively a very important benefit.

| RATIO COST/BENEFIT B.V. (biological value) of different foods | |
|---|---|
| Egg | 100 |
| Meat | 86 |
| Milk | 78 |
| Soy | 73 |
| Rice | 72 |

This product has approximately 90 BV because it does not have limiting amino acids, but does have a high amount of iron and vitamins. It can be considered a nutritional supplement because it contains a high quantity of nutrients and is of sufficient quality to maintain the normal physiology of the organism with a ration/dose of approximately 40 g dry base per day.

Another advantage to note is a cost much lower than the traditional proteins on the market.

| Product | Protein (%) | Price (U$S/Kg.) |
|---|---|---|
| Powdered Egg | 47 | 8.00 |
| Meat | 17–20 | 4.00–4.50 |
| Powdered Whole Milk | 25 | 3.15 |
| Rice | 7.5 | 0.60 |
| Present Invention | 55–60 | 2.12 |

The environmental backdrop of this invention relates to the cheese and the meatpacking industries. In the cheese industry, the whey is a by-product that contaminates the environment if it is disposed of without treatment, but has a nutritional value that can be taken advantage of (proteins, vitamins, lactose, etc.) Currently, the majority of medium sized cheese plants do not have available equipment to utilize the whey and, given the economics of such sized plants, it would not be possible for them to make this investment in the near future.

On the other hand, while blood was used in ancient times as a source of nourishment, with the advent of modern civilization, this important byproduct of the meatpacking industry and source of a great variety of amino acids, proteins and iron, is no longer used.

It is desirable that a conscientious treatment and utilization of these by-products of the cheese and meatpacking industries be developed with the double effect of favoring the production of nourishing supplements and mitigating, as a result, the contamination generated by these types of effluents.

EXAMPLES OF PREPARATION

Example 1

After considering the potential nutritional advantages of the whey/yeast/blood combination, the whey plus yeast and blood were mixed whereby a mix was obtained, in both liquid and in powder form, that had very poor organoleptic characteristics and a short shelf life.

Examples 2–7

Different types and different concentrations of thickening gels were added to the whey/yeast/blood composition to try to improve the palatability of the final product, without success.

Examples 8–11

These tests included attempts to deproteinize the whey with temperature and acidification, then effect the biological process and separate the biomass through centrifugation and mixing the oxidized blood, with or without gelatinizers. The results of the product obtained were an improvement compared with the previous tests.

Examples 12–14

Various tests were made with blood and without oxidation which was mixed with different forms of whey and biomass, with suboptimal results.

Example 15

A highly nutritious product, (90% Biological Value (BV) where an egg has 100% BV), highly absorbable (90%), palatable, unscented, good mouthfeel and spreadable paste without lumps (at least 8 mo. shelf life) or versatile powder (at least 12 mo. shelf life) at a low cost was finally obtained with the following process:

1. The process was begun with 100 liters of whey (supposing that the composition is: 5.75% solid, 0.80% protein, 4.4% lactose [hereafter the "initial value"] and 0.50% salts).
2. The whey was passed through an ultrafiltration step resulting in a) a whey protein concentrate (WPC) of 5.35 liters, with a concentration of 21.7% solids, 12.45% protein, 7.5% lactose, 0.8% salts, and b) a deproteinized whey or permeate of 94.65 liters, the average composition of which was 4.85% solid, 0.14% proteins, 4.23% lactose and 0.43% salts. The mesh size of the filter was between 0.01 and 0.1 microns based on the standard used in the industry.
3. The pH of the permeate was adjusted to 4.5 to 4.8 with comestible grade sulfuric acid. In the event that the permeate used is in a condensed or powdered form, it must be diluted with potable water and/or a residual supernatant liquid from a Step 8 described below, with the lactose content to be between 4.3 and 5.2%.
4. The following salts are then added to the permeate of Step 3 above: 270 g of PO4 H(NH4)2, 270 g of NO3K, 120 g of SO4Mg.7H2O. These salts are to be nutrients for the microorganisms to be added in Step 5 below.
5. Then, to the solution resulting from Step 4 above, 5 liters of an inoculate are added composed of a mix of the following yeast microorganisms: *Kluyveromyces lactis, Saccharomyces fragilis, Saccharomyces Cerevisiae, Torulopsis cremoris*. The inoculate is prepared by adding 2 g of yeasts per 100 g of lactose. The first two are the preferred types for lactose consumption, the third is preferred for residuals of glucose and lactate, and the fourth may be used as an alternative for lactose consumption, if needed.
6. To the mix resulting from Step 5, sterile air is then injected (0.1 to 0.15 volume of air per volume of liquid per minute) and the temperature thereof is maintained between 28 and 30 C to incubate the yeast microorganisms.
7. The incubation or biological process is stopped when the lactose level of the mix reaches below 30% of the "initial value" (1.30 to 1.40%), and such is expected to occur approximately between 35 and 40 hours after the inoculation and air injection (Steps 5 and 6), thus obtaining a biomass due to the consumption of lactose by and the multiplication of the yeast microorganisms. Throughout the biological process, measurements are effected of the concentration of lactose and the concentration of protein. Thus, the activity of the microorganisms is constantly under observation.
8. Once the biological process is completed (Steps 4–7), the biomass is separated through centrifugation or ultrafiltration (approximately 1 hr.) The separated biomass is then heated to 85 to 90 C for approximately 10–15 min. with indirect vapor to inactivate the viable cells. Part of the supernatant liquid that is separated from the biomass as a result of the centrifugation or ultrafiltration may be recycled for: a) the successive production of the biomass (Step 2), b) the dissolution of dry hemoglobin (Step 9 below); and/or c) the mixture of the biomass with the hemoglobin precipitate (Step 11 below). The rest of the supernatant liquid is disposed of as effluent or wastewater.
9. Separately, 0.900 Kg of dry hemoglobin (bovine or porcine blood) is dissolved with 10 liters of recycled supernatant liquid of the biological process at 50 C, adding 150 ml of hydrogen peroxide ($H_2O_2$) of 200 volume.
10. The mix thus obtained is then shaken for 10 minutes, forming a precipitate that is separated by filtration.
11. The whey protein concentrate from Step 2 and the biomass from Step 8 are mixed with the precipitate of the hemoglobin from Step 10 and with the supernatant liquid from the biological process of Step 8 and flour.
12. The proportions of the whey protein concentrate, the biomass, the hemoglobin precipitate, the supernatant liquid from the biological process and flour are adjusted to attain the formulation described in the attached table. See Table 1 "Formulation". The adjustment being needed depending on the amount of biomass resulting from the biological process which, due to its nature, may vary slightly each time it is undertaken, as will be readily appreciated.

TABLE 1

FORMULATION

| Composition | | WHEY* 2600 | YEAST 4500 | HEMOGLOBIN 1400 | FLOUR 900 | Dry Base 9400 | Daily Ration grams | Recommended g or mg/day | |
|---|---|---|---|---|---|---|---|---|---|
| | | | | | | | | Min | Max |
| Ingredients (%) | WHEY | 28% | 48% | 15% | 10% | 100% | 38% | | |
| Proteins % | 12% | 75% | 50% | 91.7% | 13% | 60% | 22.64 | 18 | 24 |
| Fat % | 2% | 3.80% | 3% | 5.00% | 2.5% | 3% | 1.32 | | |
| Sugars % | 75% | 15.4% | 42% | 0.30% | 82% | 32% | 12.26 | | |
| Ashes % | 8% | 5.8% | 5% | 3.00% | 0.50% | 4% | 1.71 | | |
| Calcium (mg/100 g) | | 785 | 1000 | 8.32 | 20 | 200% | 83.71 | 400 | 0 |
| Phosphorus (mg/100 g) | | 815 | | 205 | 200 | 754% | 286.46 | 300 | 0 |
| Iron (mg/100 g) | | 1.54 | | 290 | 0.8 | 44% | 16.6 | 10 | 150 |
| Niacin (Nicofinamid, Vit PP) (mg/100 g) | | 1.31 | 45% | | | 21.90% | 8.32 | 4 | 11 |
| Thiamin (B1) (mg/100 g) | | 0.68 | 2.5 | | | 1.39% | 0.5263 | 0.2 | 0.6 |
| Riboflavin (B2) (mg/100 g) | | 0.23 | 7 | | | 3.41% | 12.976 | 0.3 | 0.8 |
| Cyancobalamin (B12) (mg/100) | | 0.00338 | | | | 0.0009% | 0.0003553 | 0.1 | 0.7 |
| Pyridoxin (B6)(mg/100 g) | | 0.415 | 3 | | | 1.55% | 0.5894 | 0.2 | 0.9 |

TABLE 1-continued

FORMULATION

| Composition | | WHEY* 2600 | YEAST 4500 | HEMOGLOBIN 1400 | FLOUR 900 | Dry Base 9400 | Daily Ration grams | Recommended g or mg/day | |
|---|---|---|---|---|---|---|---|---|---|
| Ingredients (%) | WHEY | 28% | 48% | 15% | 10% | 100% | 38% | Min | Max |
| Biotin (mg/100 g) | | 0.0246 | 0.1 | | | 0.05% | 0.0208 | 0.01 | 0.025 |
| Pantothenic Acid (mg/100 g) | | 5.46 | 0.15 | | | 1.58% | 0.6012 | 2 | 3.5 |
| Inositol (mg/100 g) | | | 350 | | | 168% | 63.67 | | |
| p-Aminobenzoic (mg/100 g) | | | 5 | | | 2.39% | 0.9096 | | |
| Folic Acid (mg/100 g) | | | 2.5 | | | 1.20% | 0.4548 | | |
| Treonin % | | 3.37 | 2.4 | 3.4 | 0.4 | 2.626 | 99.78 | 34 | 0 |
| Valine % | | 3.03 | 2.8 | 8.4 | 0.64 | 3.491 | 132.65 | 35 | 0 |
| Metionine % | | 3.83 | 0.6 | 1.5 | 0.24 | 1.59 | 60.43 | 25 | 0 |
| Isoleucine % | | 4.23 | 2.5 | 0.18 | 0.6 | 2.451 | 93.14 | 28 | 0 |
| Leucine % | | 7.54 | 3.8 | 12.3 | 0.98 | 5.83 | 221.56 | 66 | 0 |
| Fenlialanine % | | 2.69 | | 7.1 | 0.69 | 1.868 | 70.97 | 63 | 0 |
| Triptofano % | | 3.93 | 0.6 | 1.8 | 0.14 | 1.656 | 62.92 | 11 | 0 |
| Lisine % | | 7.18 | 3.1 | 9.4 | 0.29 | 4.898 | 186.12 | 58 | 0 |
| Histidine % | | 1.65 | 2.7 | 7 | 0.26 | 2.816 | 107.02 | 19 | 0 |
| Arginine % | | 0.87 | 2.4 | 3.1 | 0.53 | 1.902 | 72.28 | | |
| Purine % | | | 11 | | | 5.266 | 200.11 | 2 | |
| Retinol (Vit A) (ug %) | | | | | | | | 400 | 0 |
| Vitamine E (ug %) | | | | | | | | 3 | 4 |
| Vitamine K (ug %) | | | | | | | | 5 | 20 |

WHEY* is fermented and precipitated whey

13. The mix of Step 12 is then homogenized, made palatable, given the desired mouthfeel and color as a result of being put through a colloidal mill. Good results have been achieved when the mix was put through a colloidal mill at least twice. This step according to the invention has been found to yield good results. It is believed the colloidal mill processing provides the excellent quality of palatability of the nutritional product which has been achieved, while preserving the rich nutrients of the natural ingredients in accordance with the invention 14. At this point the resulting product has neither smell nor taste. Depending on the taste preference of the final user, the final product may be flavored, for which the necessary additives would typically be added at this stage of the process.

15. If the desired final product is to be in powdered form, the homogenized paste is passed through a spray dryer.

16. If the final product is to be in paste form, it is sterilized by heating the paste at 70 C while mixing for 5 min, resulting in a product with 40% solids.

17. The packaging of either the paste or powder form may be made in vacuum packages whereby air cannot enter or exit, the specifications of which should conform with food packaging regulations, as will be readily appreciated.

18. When the process is set up as a continuous process, it will be possible to obtain the inoculate directly by taking a portion from the processing of the biomass at the point of maximum activity of the microorganisms which may be freeze-dried.

19. The resultant nutritional supplement or product, in dry base form, is between 4.8 Kg and 5.2 Kg in the final product.

20. With reference to TABLE 1 ("Formulation") the compositions of the various ingredients may vary within the following ranges:

| Whey | 20–40% | Preferably 28% |
| Yeast | 10–50% | Preferably 48% |
| Hemoglobin | 8–35% | Preferably 15% |
| Wheat flour | 5–12% | Preferably 10% |

A colloidal mill successfully used for the pilot process described herein had the brand name TAN MILL'S, Model No. MC 80, and had a feed rate (liters/min.) for paste of 3.33 to 5, and for liquid of 5 to 8.33. The colloidal mill was a 3 HP, 3,000 rpm, model with an 80 mm rotor diameter. The bin capacity was 20/30 liters. The flow volume (l/hr) for paste was 200/300, and for liquids was 300/500. The mill was mounted on a mobile base and had a vertical orientation.

It is contemplated that industrial scale mills for production may be used.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. A process of making a nutritional supplement, comprising the steps of:
   a. providing whey;
   b. providing blood from livestock;
   c. mixing the whey and the blood together to result in a whey and blood mixture;
   d. treating the whey and blood mixture sufficiently to yield a colloidal mixture; and e. in the step of treating the whey and blood mixture the whey and blood mixture are sufficiently milled so as to obtain a substantially odor free and taste free colloidal mixture.

2. A process as in claim 1, wherein:
a. in the step of treating the whey and blood mixture, a colloidal mill is used to treat the mixture.

3. A process as in claim 2, wherein:
a. the whey and blood mixture is milled by the colloidal mill at least two times.

4. A process as in claim 3, wherein:
a. the whey and blood mixture milled by the colloidal mill is subjected to a drying step to yield a powdered form.

5. A process as in claim 4, wherein:
a. the drying step is carried out by a drying chamber.

6. A process as in claim 1, wherein:
a. the whey is filtered sufficiently to result in a whey protein concentrate and a permeate of deproteinized whey;
b. a yeast is added to the permeate, the yeast being selected for lactose consumption;
c. the permeate having yeast therein is incubated until the lactose level of the permeate has reached below 30% of its initial lactose level, thus resulting in a biomass; and
d. the biomass is mixed with the blood.

7. A process as in claim 6, wherein:
a. the blood is precipitated prior to the step of mixing the biomass with the blood.

8. A process as in claim 7, wherein:
a. the blood is precipitated by the addition of hydrogen peroxide.

9. A process as in claim 8, wherein:
a. the blood includes rehydrated dried blood.

10. A process as in claim 1, wherein:
a. the blood includes rehydrated dried blood.

11. A process as in claim 6, wherein:
a. the yeast includes one of *Kluyveromyces lactis* and *Saccharomyces fragilis*.

12. A process as in claim 11, wherein:
a. the yeast includes *Saccharomyces cerevisiae*.

13. A process as in claim 6, wherein:
a. the yeast includes *Torulopsis cremoris*.

14. A process as in claim 11, wherein:
a. a farinaceous material is added during the step of mixing.

15. A nutritional supplement made in accordance with the process of claim 14.

16. A nutritional supplement made in accordance with the process of claim 11.

17. A nutritional supplement made in accordance with the process of claim 7.

18. A nutritional supplement made in accordance with the process of claim 6.

19. A nutritional supplement made in accordance with the process of claim 3.

20. A nutritional supplement made in accordance with the process of claim 2.

21. A nutritional supplement made in accordance with the process of claim 1.

22. A process of making a nutritional supplement, comprising the steps of:
a. providing whey;
b. providing blood with its plasma removed from blood of livestock;
c. mixing the whey and the blood with its plasma removed together to result in a whey and blood with its plasma removed mixture; and
d. treating the whey and blood with its plasma removed mixture sufficiently to yield a colloidal mixture.

23. A process as in claim 22, wherein:
a. the whey and blood with its plasma removed mixture are sufficiently milled so as to obtain a substantially odor free and taste free colloidal mixture.

24. A process as in claim 22, wherein:
a. the whey is filtered sufficiently to result in a whey protein concentrate and a permeate of deproteinized whey;
b. a yeast is added to the permeate, the yeast being selected for lactose consumption;
c. the permeate having yeast therein is incubated until the lactose level of the permeate has reached below 30% of its initial lactose level, thus resulting in a biomass; and
d. the biomass is mixed with the blood with its plasma removed.

25. A nutritional supplement made in accordance with the process of claim 23.

26. A process of making a nutritional supplement, comprising the steps of:
a. providing whey;
b. providing at least one of blood with its plasma removed and blood from livestock;
c. mixing the whey and the at least one of blood with its plasma removed and blood together to result in a whey and at least one of blood with its plasma removed and blood mixture;
d. providing a colloidal mill; and
e. milling the whey and at least one of blood with its plasma removed and blood mixture in the colloidal mill sufficiently to yield a substantially odor free and taste free colloidal mixture.

27. A process as in claim 26, wherein:
a. the whey is filtered sufficiently to result in a whey protein concentrate and a permeate of deproteinized whey;
b. a yeast is added to the permeate, the yeast being selected for lactose consumption;
c. the permeate having yeast therein is incubated until the lactose level of the permeate has reached below 30% of its initial lactose level, thus resulting in a biomass; and
d. the biomass is mixed with the at least one of blood with its plasma removed and blood.

28. A nutritional supplement made in accordance with the process of claim 27.

29. A nutritional supplement made in accordance with the process of claim 26.

* * * * *